July 9, 1974

W. C. SCHROEDER 3,823,084

HYDROGENATION OF COAL

Filed June 30, 1972

July 9, 1974     W. C. SCHROEDER     3,823,084

HYDROGENATION OF COAL

Filed June 30, 1972     3 Sheets-Sheet 2

Fig. 2.

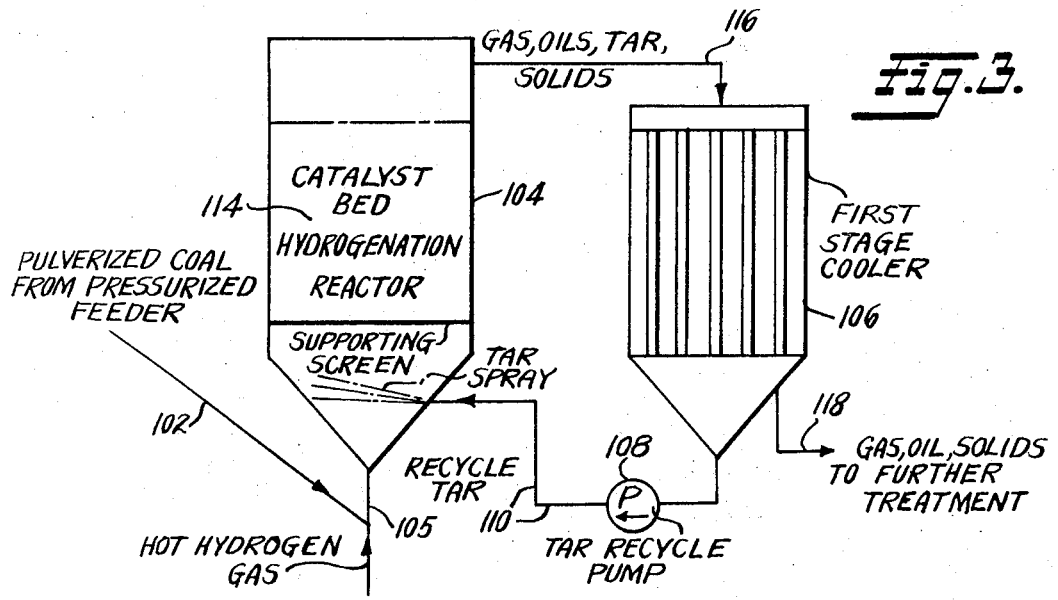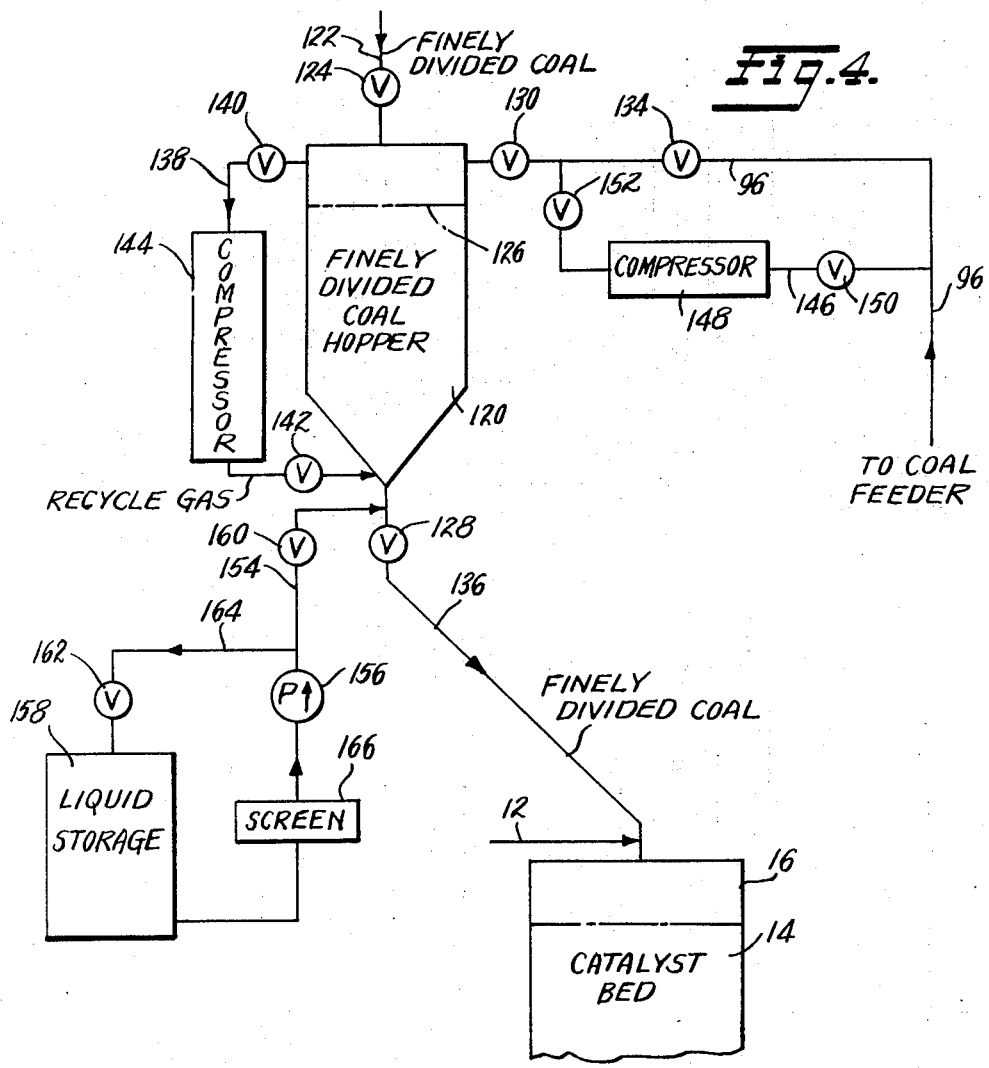

United States Patent Office 3,823,084
Patented July 9, 1974

3,823,084
HYDROGENATION OF COAL
Wilburn C. Schroeder, 7316 Radcliffe Drive,
College Park, Md. 20740
Filed June 30, 1972, Ser. No. 268,201
Int. Cl. C10g 1/06
U.S. Cl. 208—10                                                17 Claims

ABSTRACT OF THE DISCLOSURE

Pulverized coal, in the substantial absence of pasting or slurrying medium, is dispersed into a recycle stream of preheated, high-pressure hydrogen and the resultant reaction stream is passed through a hydrogenation zone containing a bed of hydrogenation catalyst at a rate sufficient to sweep unreacted coal, coal ash and hydrocarbon reaction products from the catalyst bed. Liquid and gaseous hydrocarbon products, after sulfur removal, are recovered from the product stream. A high hydrogen recycle ratio through the catalyst bed is employed to prevent catalyst inactivation by product hydrocarbons. A novel method of feeding the pulverized coal into the high pressure system from a hydrogen pressurized hopper without permitting the compressed hydrogen to expand to lower pressure, thereby reducing the energy requirements of the system, is disclosed.

BACKGOUND OF THE INVENTION

This invention relates to a continuous process for the hydrogenation of coal.

In my U.S. Pats. No. 3,030,297 and No. 3,152,063, I have described continuous processes for the production of liquid and gaseous hydrocarbons by the rapid and direct hydrogenation of dry, pulverized and catalyzed coal, lignite or char, in the absence of pasting oil, at pressures in the range of about 500 to 6000 p.s.i.g. and temperatures in the range of about 450 to 1000° C. and with relatively short contact times between the coal and hydrogen. In these processes, catalysts were incorporated in the pulverized coal and catalyst recovery and reuse was difficult.

Coal hydrogenation has now become of increasingly greater importance in view of foreseeable shortages of hydrocarbon gases and liquids from other sources. The present invention provides an improved coal hydrogenation process for converting coal into low-sulfur liquid and gaseous produucts. The coal is thereby converted into a more desirable form for further processing or use.

SUMMARY OF THE INVENTION

The process of the present invention comprises the dispersion of pulverized coal, in the substantial absence of pasting or slurrying medium, into a recycle stream of pre-heated, high pressure hydrogen and passage of the resulting coal-hydrogen mixture through a bed of solid hydrogenation catalyst at a rate sufficient to sweep unreacted coal, coal ash and hydrocarbon reaction products from the catalyst bed. The flow rate of hydrogen and ratio of hydrogen to coal is preferably such that the gases and vapors in contact with the catalyst contain at least about 90% hydrogen. In a preferred embodiment pulverized coal is fed into the system from hydrogen pressurized hoppers which preferably utilize a liquid to displace residual high pressure hydrogen from an empty hopper into the recycle hydrogen stream whereby energy losses due to expanding and repressurizing hydrogen for the hopper feed system are minimized.

By the process of the invention, hydrocarbon liquids and gases are produced from solid carbonaceous material such as coal at short reaction times in the presence of suitable catalyst which remain in the system, the gases are separated from the liquids, clean unused hydrogen under pressure is recovered for recycle to the process, sulfur compounds are removed from the gaseous and liquid products and the relative amounts of liquid and gas which are produced are controlled.

It is an object of the present invention to provide an improved catalytic process for the hydrogenation of pulverized coal, in the substantial absence of pasting or slurring medium.

Another object of the invention is to provide an improved process for the catalytic hydrogenation of pulverized coal wherein catalyst losses are minimized.

A further object of the invention is to provide a process for the catalytic hydrogenation of pulverized coal wherein improved contact between the coal and catalyst is achieved.

A further object of the invention is to provide a method for removing sulfur from the products of coal hydrogenation.

A still further obpect of the invention is to provide a process for the hydrogenation of coal wherein energy requirements for the compression of gases are minimized.

Other objects and advantages of the invention will be apparent to those skilled in the art from the following detailed description and from the accompanying drawings, wherein:

FIG. 2 is a detailed flow diagram of the hydrogenation, product separation and recycle steps of FIG. 1.

FIG. 3 is a diagrammatic illustration of a modified coal hydrogenator for use in the process of FIG. 1.

FIG. 4 is a detailed illustration of a preferred pressurized coal feed system for the process of FIG. 1.

DETAILED DESCRIPTION OF THE INVENTION

Figure 1:
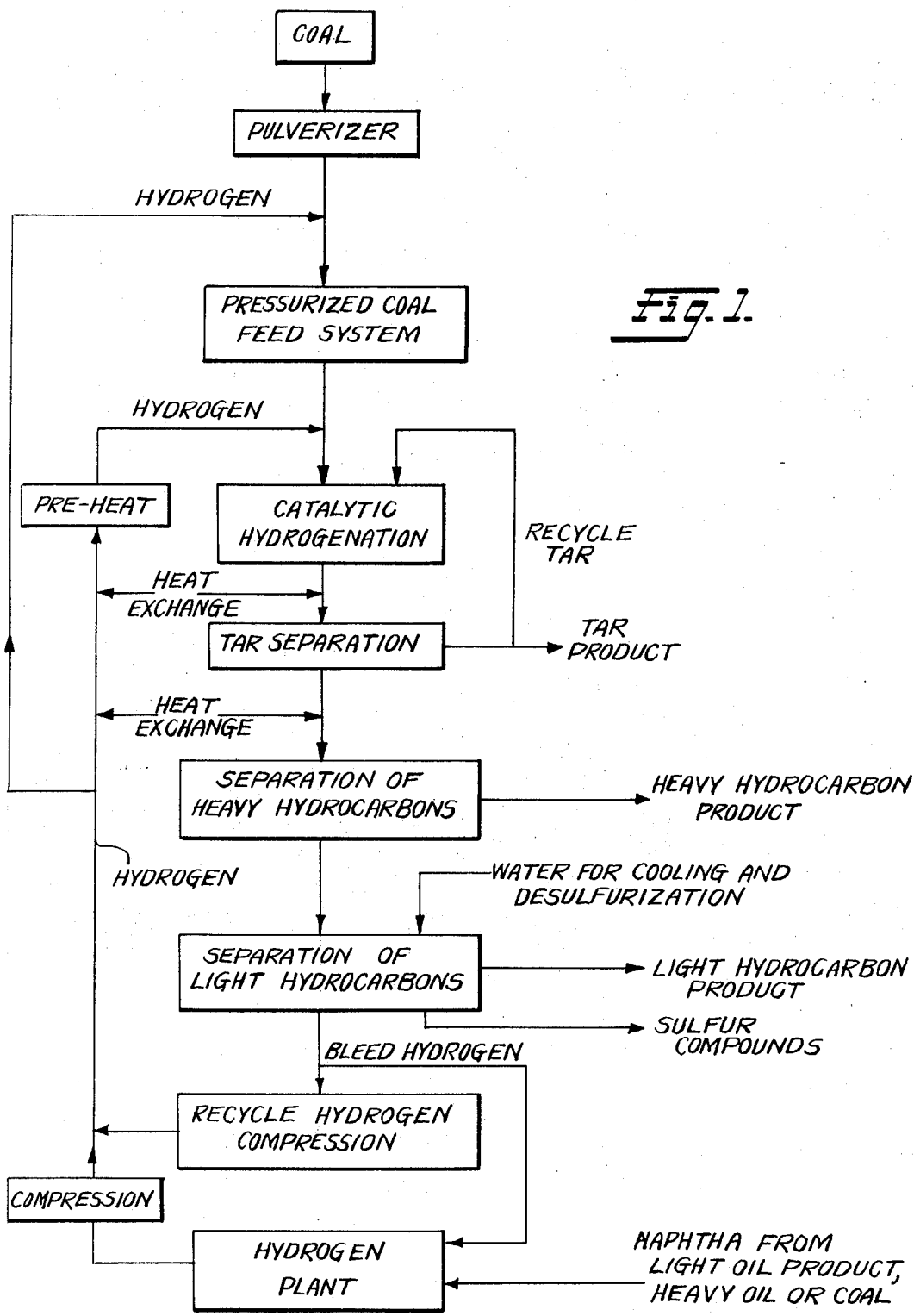
FIG. 1 is a flow diagram generally illustrating the process of the invention wherein coal is hydrogenated on a continuous basis to produce both heavy and light oils.

In a representative embodiment of the invention, as illustrated in FIG. 1., coal or other solid carbonaceous material is crushed or pulverized, preferably until the majority of the particles pass through a 200 mesh screen. This coal is fed to a pressurized catalytic reactor by suitable means, such as by a stream of hydrogen or other gas or by a screw conveyor from a pressurized hopper as disclosed in my prior Pats. No. 3,030,297 and No. 3,-152,063. A preferred method of feeding the coal is described below and in my copending application Ser. No. 268,202 filed on June 30, 1972 entitled "Method and Apparatus for Feeding Finely Divided Solids to a Pressurized Gas or Gas-Liquid-Solids System."

The catalytic hydrogenation of the coal may be carried out at any pressure from 1000 to 5000 p.s.i.g. but the preferred pressure is from 2000 to 3000 p.s.i.g. Reaction temperatures are from 450 to 650° C. The major products are liquid hydrocarbons in the range from 450 to 525° C., while above 550° C. the major products are hydrocarbon gases.

The pulverized coal is fed, with a stream which is largely hydrogen gas, to the top of the catalytic reactor and passes downward through a bed of catalyst contained in the reactor, or is fed to the bottom of the catalytic reactor and passed upward through the bed of catalyst in the reactor.

The catalyst is cobalt or cobalt-molybdenum, iron, nickel or other well-known coal hydrogenation catalyst usually on a substrate such as kieselguhr, alumina, silica or other inert material. With hydrogen and coal passing downward through the reactor the catalyst is in the form of a fixed bed. When the hydrogen and coal pass upward, the catalyst may be in the form of a fixed bed or a bubbling or moving bed. Preferably, the catalyst is in the form of a fixed bed. While ebullating beds (e.g., of the type shown by Johnson et al. Pat. No. 3,607,719) or other types of moving catalyst beds known to the art may be used, the motion and rubbing of the catalyst particles tends to cause wear on the surface and catalyst loss. The use of a fixed catalytic bed is preferred from the viewpoint of retaining catalyst in the bed and eliminating the expense of catalyst recovery and replenishment. The catalyst may be in the form of beads, spheres, cylinders or other convenient shapes of a size range facilitating the passage of the gaseous dispersion of coal therebetween. In fixed beds the catalyst particle size will, in general, range from about $\frac{1}{10}$ inch up to $\frac{3}{4}$ inch or more. In moving beds the particle size will be governed by the type of movement desired as is well known to the art.

The hydrogenation of coal produces a slight release of heat. If the hydrogen gas is preheated to the desired operating temperature or somewhat higher than this temperature, the necessary reaction temperature in the coal hydrogenation reactor can be maintained. It is not necessary to heat the coal, although this may be done if desired. Heating the reactor is unnecessary if the loss of heat is not excessive.

All product gases, liquid and solid materials are carried out of the reactor with the gas stream. A preferred method of operation is to cool this stream sufficiently to condense the tar. The condensed tar may be separately processed or recycled back through the hydrogenation reactor. Further cooling of the product stream condenses a heavy hydrocarbon liquid which is essentially free from sulfur compounds and which may readily be freed of solids such as ash and unreacted carbon by centrifuging or filtering. The gas stream then goes through further cooling and washing steps which condense out, and separate all further heavy and light oils, which are recovered and are ready for refining.

During the hydrogenation of the coal, sulfur and sulfur compounds derived from the coal are converted to $H_2S$ which is a gas, and this joins the hydrogen stream. Both heavy and light oils from the process are essentially free of sulfur compounds. The $H_2S$ is removed from the gas in a water wash under pressure.

A large excess of hydrogen must be present over that required to react with the coal. This hydrogen gas after washing has lost only the pressure required for circulation through the system. The loss in pressure, which is about 150 p.s.i.g. is made up by a recycle compressor; the gas then goes through heat exchangers to bring it to the desired temperature and is then recycled back to the hydrogenation reactor.

The amount of hydrogen used in the process depends on the coal and the products to be produced. Hydrogen is used to convert the sulfur or sulfur compounds in the coal to $H_2S$ and the oxygen or oxygen compounds in the coal (not that present as $H_2O$) is converted to $H_2O$. Coals high in sulfur and oxygen compounds (exclusive of $H_2O$) tend, therefore, to use more hydrogen than coals low in these materials. If the product from the hydrogenation is heavy oil this requires less hydrogen than if the product is lighter oil. The product ion of large amounts of methane gas requires very large amounts of hydrogen.

To produce a heavy oil from bituminous coal normally requires 7000 to 9000 standard cubic feet of hydrogen per ton of coal. To produce a high percentage of light oils may increase hydrogen consumption to 14,000 or 15,000 standard cubic feet per ton of coal.

The necessary hydrogen for the process can be provided from oils and gases generated in the process or from auxiliary coal. There are well-known processes for doing this, and only their essential features related to this invention need be pointed out.

Naphtha or lighter products produced from the light oils can be processed to furnish hydrogen by reforming with steam. The naphtha and steam are passed over a catalyst at high temperature and reacted to produce $H_2$, CO and $CO_2$. These gases are cooled to about 800° F. and the CO is reacted over a catalyst with steam to produce more hydrogen, as follows:

$$CO + H_2O \rightarrow CO_2 + H_2$$

This step is known as the shift conversion step. The gas is then purified to remove $CO_2$, giving a final hydrogen product. Normally, this process provides the hydrogen at about 450 p.s.i.g. It is then further compressed to provide the fresh hydrogen for coal hydrogenation.

The bleed stream from the recycle hydrogen, as shown in FIG. 1, may also be fed to this process with the naphtha. The methane and other hydrocarbon gases in this stream are reformed to supply additional hydrogen.

It may be necessary to remove small traces of $H_2S$ from the feed stream as well known in the art, since these poison the catalyst in the naphtha-steam reformer. Any other streams of methane gas available from the coal hydrogenation process or subsequent processing of the oils may be fed to the reformer.

Other raw materials such as oil or coal or a mixture of the two can be processed to furnish hydrogen instead of naphtha. In this case an air separation plant is required to produce oxygen of about 85–95 percent purity. Preheated oxygen and steam are reacted with oil or coal at a high temperature to give a gas containing $H_2$, CO, $CO_2$, $H_2O$ and minor amounts of impurities such as $H_2S$. This gas is purified to remove $H_2S$ and $CO_2$ and then reacted with more steam to produce $H_2$ from the CO in a shift converter, as previously indicated. The gas is again treated to remove $CO_2$ and water vapor and provide pure hydrogen for the hydrogenation process. The bleed stream, or any other available methane or hydrocarbon gases can be used as raw material for this process along with coal and oil. Sulfur in the raw materials does not cause difficulties in the fuel-oxygen reaction and the gas from this unit is purified to remove sulfur before it passes through the shift converter.

It is important that the gas introduced to the hydrogenation reactor should be relatively pure hydrogen and that it should not contain high concentrations of methane or other hydrocarbon gases. Experiments conducted to determine the effect of diluting hydrocarbon gases showed that at 2000 p.s.i.g. and 500° C. with 100% hydrogen, the total yield of gases and liquid products was over 95% of the carbonaceous matter in the coal. At the same temperature, using a total pressure of 4000 p.s.i.g. with a hydrogenating gas containing 50% hydrogen and 50% natural gas, the total conversion decreased to 87%. At a total pressure of 6000 p.s.i.g. with a hydrogenating gas containing 33% hydrogen and 67% natural gas, the total conversion was 45%. Since the partial pressure of hydrogen was the same in all of these experiments it is apparent that the presence of the natural gas had an undesirable effect on the reaction between the hydrogen and the coal at the surface of the catalyst. It is essential, therefore, that the hydrogen gas going to the reactor should not contain high concentrations of methane or other hydrocarbon gases and preferable that the total concentration of hydrocarbon gases and vapors in the hydrogen in contact with the catalyst should be less than 10% by volume. The invention provides means for controlling this concentration of hydrocarbon gases by varying the ratio of recycle hydrogen to bleed hydrogen.

Operating conditions in the hydrogenation reactor control to a considerable degree the composition of the liquid products as well as the amount of gas formed. At temperatures in the range from 450 to 500° C. and partial pressures of hydrogen from 2000 to 3000 p.s.i.g. in the presence of a suitable coal hydrogenation catalyst, the formation of gas can be kept to only a few percent of the hydrogenatable carbonaceous material. Liquid product under these conditions amounts to 85–95 percent of the hydrogenatable material.

At higher temperatures, above 500° C., the amount of gas produced is large and above 550° C. it rises to 50 or 60 percent of the hydrogenatable carbonaceous material. This gas is mainly methane.

Contact time required in the catalyst bed of the coal hydrogenation reactor depends on temperature and to a lesser extent on the pressure of the hydrogen gas. From 450 to 500° C. the desired contact time ranges from 20 seconds to one minute. The longer contact time favors the production of lighter oil products. Above 500° C. the required contact time becomes shorter and is in the range from 5 to 30 seconds.

Referring now to FIG. 2 of the drawings, pulverized coal fed from a pressurized hopper (not shown) through line 10, preferably in the manner hereinafter described, is mixed with hot recycle hydrogen and fresh hydrogen gas from line 12 at the required temperature of about 460° C. and pressure of 2000 to 3000 p.s.i.g. and flows downward through the catalyst bed 14 in the coal hydrogenation reactor 16.

The catalyst bed 14 of the reactor 16 is supported at the bottom on a coarse screen 18 which allows all material entering the reactor to pass through. The preferred catalyst material is alumina-supported cobalt-molybdenum in the form of pellets or sized granular materials with large sizes at the top of the bed to allow the hydrogen and coal to flow into the bed rapidly and smaller sizes at the bottom. Near the bottom of the bed most of the coal has turned to liquid and this will flow in vapor form through the smaller size catalyst material. The catalyst bed 14 is made deep enough to provide the required retention time.

All material leaves the bottom of the reactor 16 and enters the first stage heat exchanger or tar condenser 20 where it is cooled to approximately 310° C. to condense the tar. The tar is accumulated in the bottom of the heat exchanger 20 and is pumped by a pump 22 either out of the system through line 24 or back to the top of the catalyst bed 14 through line 26. There are two advantages for the recycle of tar. First, the tar is again hydrogenated and converted largely to oil. This makes the separation of solids from the product oil in subsequent steps a much easier operation; second, the tar helps to carry the coal into the catalyst bed and improves the contact of the coal with the catalyst surface, which in turn increases the speed of the coal hydrogenation reactions. In the process of the invention there is no mixing of the coal particles with tar prior to the hydrogenation reactor and the pumping of coal-liquid slurries as has been used in other hydrogenation processes is avoided.

All remaining materials, namely gas, oils and solids, are taken from the first heat exchanger 20 in such a manner as to leave a pool of molten tar in the bottom, and are then passed by line 27 through a second heat exchanger 28 to condense the heavy oils. The ash from the coal and any unreacted carbon are largely carried down with the heavy oil.

The entire stream goes from the second stage heat exchanger 28 through line 30 into a heavy oil separator 32. A liquid level 34 is maintained in the heavy oil separator 32 with the heavy oil and solids on the bottom and gases and light oils in the vapor phase.

The heavy oil and solids are withdrawn from the bottom of separator 32 through line 35 and pressure reduction valve 36 and may be utilized or treated as follows: (a) by passage through line 38 for combustion directly in a utility or large industrial boiler; (b) by passage through line 40 to separator 42 where solids may be removed by centrifuging or filtration to provide a product heavy oil 44. Since the heavy oil is essentially tar free, the solids can be removed through line 46 and washed in contact vessel 48 with a lighter hydrocarbon liquid such as gasoline, naphtha, or kerosene, so that there is little loss of oil on the solids. The light hydrocarbon liquid of product stream 50 can then be recovered from the heavy oil by distillation for reuse in the solids washing; (c) heavy oil and solids can be sent through line 52 to a liquid phase hydrogenation to produce light oils. The light oils are freed from solids by distillation in subsequent refining steps.

The gas and light oils from the vapor section of the heavy oil separator are passed by line 54 to liquid contact vessel 56 and washed by direct contact with water supplied by pump 58 through line 60 to condense the light oils and to remove the $H_2S$ from the gas stream. The contact vessel 56 for the water wash may be a packed tower, a tower equipped with trays or screens, or a spray tower. This wash is conducted at the pressure existing in the system at this point. Recycle gas, which is predominantly hydrogen passes out of vessel 56 through line 61.

The mixture of water containing $H_2S$ and light oils from the bottom of the contact vessel 56 is taken through line 62 to a light oil separator 64. The light oils from the top of the separator 64 are distillable oils and are withdrawn through product line 66 and separated to useful products.

The water from contact vessel 56 with the dissolved $H_2S$ will still contain some light oils. This is taken from the bottom of the separator 64 through line 68 and pressure reduction valve 70 into a flashtower 72 where the $H_2S$ is allowed to flash off through line 74 carryng the light oils with the steam. The steam and light oils are condensed in a heat exchanger 76 and the light oil is again separated from the water in a light oil separator 78. This oil is passed through line 80 to join the other light oil product in product line 66. The water freed from $H_2S$ is recycled to the wash system through line 81. Fresh water for make-up is supplied to the system through line 82.

Since it is not desirable to vent the $H_2S$ to the atmosphere the $H_2S$ may be passed through line 84 for treatment in any suitable means. For example, it may be utilized in a Claus process to recover sulfur.

It is to be understood that this method of removing $H_2S$ from the gas stream is a preferred method because of its simplicity and the use of water which is a low cost washing material. However, other methods of removing $H_2S$ are available and can be used. These include the use of hot potassium carbonate, mono-ethanolamine, or a number of other well-known washing materials and processes.

The hydrogen gas which has been washed to remove $H_2S$, is now ready for recycle back to the process through line 86. It is not important that the gas be completely free of sulfur, since sulfur compounds are not a poison to the coal hydrogenation catalysts.

There is a slow accumulation of methane in the hydrogen stream and it is not desirable to allow the concentraton of this gas to reach more than a small percentage in the recirculated hydrogen. A bleed stream 88 is provided to control the amount of methane accumulated. This bleed stream is used as part of the feed to the processes used to supply fresh hydrogen to the system, as will be explained later.

The recycle gas then goes through the recycle hydrogen compressor 90 to restore the pressure lost in circulation through the system. Additional hydrogen which is needed in the cycle may enter through hydrogen compressor 92 and line 94 at either the high or low pressure side of the recycle compressor 90.

It will be noted that a line 96 from the high pressure side of the recycle compressor 90 goes back to the coal feeder to supply gas under the pressure of the system to the feeder and to maintain this pressure while the coal is feeding from the pressurized coal hopper.

The recycle hydrogen through line 86 then goes back to the second and first stage heat exchangers 28, 20 and finally through a hydrogen preheater 100 which is heated by combustion gases. This heats the recycle hydrogen and the fresh hydrogen to the desired temperature to go back to the hydrogenation reactor 16.

It is to be understood that preheating the recycle hydrogen may be done by other methods. This is a suggested or preferred method, since it makes efficient use of the heat in the stream leaving the hydrogenation reactor to heat the recycle hydrogen.

FIG. 3 shows a preferred method for the hydrogenation of coal with upward flow through the coal hydrogenation reactor. Pulverized coal from line 102 joins the hot hydrogen stream and the mixture enters catalytic reactor 104 through line 105, as shown. Recycle tar from the first stage cooler or tar condensor 106 is pumped by pump 108 through line 110 and is sprayed into the stream of hydrogen and coal to thereby disperse the tar into fine droplets just below the catalyst bed 114. All feed materials are then carried through the catalyst bed out of the hydrogenation reactor through line 116 and into the first stage cooler 106. Tars are condensed at the bottom of this cooler and recycled back to the reactor. All remaining gas, oils and solids from this cooler go through line 118 into the remainder of the processng system as set forth for FIG. 1.

For the upward flow reactor the hydrogen velocities must be sufficient to carry the coal particles, ash and tar droplets through the catalyst bed and out of the reactor. The maintenance of gas velocities from ½ to a few feet per second based on the free cross section of the reactor are satisfactory.

The catalyst bed 114 may be a fixed bed or a bubbling bed. With a bubbling bed the attrition of the catalyst can cause loss. The catalyst particles must be maintained large enough so that they are not carried out of the bed.

The preferred method for feeding finely divided or pulverized coal to the pressurized system is shown in FIG. 4.

Heretofore, one method of introducing finely divided coal into a pressurized hydrogenation system has been to mix or slurry the finely divided coal with a pasting oil and pump this slurry into the pressurized system. The pressurized feed system described herein makes it unnecessary to slurry the coal solids with a liquid. It further eliminates the difficult problems of suitable pump valves to handle slurries of coal solids and liquids and the problems of wear and errosion caused by soils going through high pressure pumps. It also makes it possible to put the coal solids into the hydrogenator without liquid.

The feed system provides further for using hydrogen from the pressurized system to create the initial pressure in the hopper containng the finely divided coal solids and to maintain this pressure while the coal solids flow from the hopper into the pressurized system. Additionally, it provides means for maintaining a slightly higher pressure in the hopper containing the finely divided solids, if this is needed to secure the desired rate of flow of finely divided coal solids into the pressurized system.

Finally, when the hopper is empty of coal it is then full of pressurized gas and means are provided to force this gas back into the pressurized system using minimum energy so that there is no loss of gas or pressure.

Reference is made to FIG. 4 illustrating how this is accomplished. Finely divided or pulverized coal is charged into hopper 120 through line 122 and open valve 124 until the solids reach the upper solids level shown at 126. The valves 128, 130 and 160 are closed during this charging operation. When charging of the hopper 120 is completed the valve 124 is closed. Valve 130 is then opened, which permits pressurized hydrogen from line 96 to flow through open valve 134 to bring hopper 120 up to full system pressure. Valve 128 in coal feed line 136 is then opened to permit the flow of coal solids into the pressurized system. The coal in line 136 joins the hydrogen stream in line 12 and the mixture then enters the reactor 16. Valve 128 may be used to control the rate of flow of coal solids if desired. Alternatively, other means (not shown) in line 136 may be used to control the rate of flow of solids, such as a screw feeder or star feeder.

A circulating line 138 containing valves 140 and 142 and compressor 144 are provided to allow gas to be circulated from the top of the hopper to the bottom to agitate the solid if desired.

The agitation of the finely divided solids may also be accomplished by allowing part or all of the gas from line 96 to enter near the bottom of the hopper. This can be used as a means of eliminating the recycle compressor 144.

The hopper 120 may be maintained at a higher pressure than the pressurized system, which may assist in feeding the solids, by supplying hydrogen from line 96 through by-pass line 146, compressor 148 and valves 150 and 152. In this instance valve 134 is closed and valves 150 and 152 are opened. Compressor 148 can then be used to provide the necessary increase in pressure.

When the finely divided solids in the hopper 120 have been exhausted, valve 128 is closed. The hopper 120 now contains high pressure hydrogen. Valve 134 is opened after valves 150 and 152 have been closed and the valves 140 and 142 to the recycle compressor 144 are also closed. Liquid is now pumped into hopper 120 through line 154 by means of pump 156 from storage tank 158 at the necessary pressure to force the hydrogen from the hopper 120 back through the flow line 96 into the pressurized system. During this operation valve 160 in line 154 is open and valve 162 in liquid return line 164 is closed. It will be noted that the hydrogen in the hopper 120 is displaced at systems pressure back into the system. No energy is lost by allowing the gas to expand and recompressing it. Likewise there is no loss of gas from the system.

Any suitable and pumpable liquid may be used, such as water or oil. A screen 166 is provided between storage tank 158 and pump 156 to prevent any solids from entering the liquid pump 156.

When discharge of the hydrogen from hopper 120 is completed the liquid pump 156 is stopped, valve 130 is closed and valve 162 is opened. This allows the liquid to discharge from the hopper 120 back to liquid storage tank 158. If desired, a small amount of hydrogen from the system may be admitted through valve 130 to hasten this discharge.

It is to be noted that liquid used in the system is circulated in and out of storage. This eliminates the use of large amounts of liquid and any discharge from the feeder of liquid which may contain solids.

When the liquid is discharged valve 160 is closed. If valve 130 has been opened slightly it is also closed. The hopper 120 is then recharged with finely divided coal by opening valve 124. When the hopper 120 is charged, valve 124 is closed and valve 130 opened to bring the hopper up to systems pressure. The system is again ready to feed finely divided coal to the pressurized system.

To secure a continuous flow of solids to the pressurized system two or more hoppers connected to the necessary control and pumping system may be used. The preferred process and systems of the invention have been illustrated and described. It will be understood that, within the scope of the appended claims, other practical modifications and variations may be employed.

I claim:

1. A continuous process for the hydrogenation of coal in a closed cyclic system which is maintained under hydrogen pressure comprising dispersing finely divided coal, in the substantial absence of externally supplied liquid slurry meduim, into a stream of relatively pure hydrogen comprising purified recycle hydrogen and containing less than 10% hydrocarbon gases and vapors, at hydrogenation temperature and pressure, passing the resultant reaction stream through a reaction zone containing a bed of particulate hydrogenation catalyst at a hydrogen flow rate sufficient to remove products of the reaction from the catalyst bed, separating hydrocarbon products at system pressure from the resulting effluent stream from the reaction zone, and scrubbing the resulting gaseous stream at system pressure to remove sulfur gases and provide the purified recycle hydrogen.

2. The process of Claim 1 wherein the temperature of the reaction zone is about 450 to 600° C., the hydrogen pressure is about 1000 to 5000 p.s.i.g and the catalyst contact time is from about 5 seconds to one minute.

3. The process of Claim 1 wherein the temperature of the reaction zone is about 450 to 525° C., the hydrogen pressure is about 1000 to 3000 p.s.i.g. and liquid hydrocarbon products are largely produced.

4. The process of Claim 1 wherein the flow rate of hydrogen with respect to coal is maintained sufficiently high that the gases and vapors in contact with the catalyst contain at least 90% hydrogen.

5. The process of Claim 3 wherein the temperature of the reaction zone is about 450 to 475° C. to thereby produce largely heavy oil by said hydrogenation.

6. The process of Claim 3 wherein the temperature of the reaction zone is about 475 to 525° C. to produce largely light oils by said hydrogenation.

7. The process of Claim 1 wherein the product stream from the reaction zone is cooled to condense tar and the tar is recycled to the reaction zone for further hydrogenation.

8. The process of Claim 1 wherein the hydrogenation catalyst is contained in a fixed bed.

9. The process of Claim 1 wherein all of the heat for the hydrogenation reaction is supplied by heating the hydrogen stream prior to dispersing the finely divided coal into said stream.

10. The process of Claim 1 wherein the temperature is in the range of about 450 to 525° C., the pressure is in the range of about 1000 to 3000 p.s.i.g., normally liquid hydrocarbon products of the hydrogenation reaction are separated from the effluent stream from the reaction zone and the hydrogen-containing gas from which said liquid products have been removed is recycled with make-up hydrogen for hydrogenation of additional coal.

11. The process of Claim 10 wherein the recycle hydrogen is preheated by indirect heat exchange with the product stream from the reaction zone.

12. The process of Claim 10 wherein at least a portion of the make-up hydrogen is produced by reforming hydrocarbon products resulting from the coal hydrogenation.

13. The process of Claim 1 wherein the finely divided coal is forced into the stream of hydrogen from a pulverized coal container pressurized with hydrogen from the hydrogenation system.

14. The process of Claim 13 wherein hydrogen in said pressurized container, when the container is depleted of coal, is forced into the reactor system without loss of pressure by introducing a liquid under pressure into said container to displace the hydrogen.

15. The process of Claim 14 wherein the liquid in the container, after displacement of the hydrogen, is withdrawn, the container is filled with pulverized coal, and the pulverized coal is re-pressurized with hydrogen from the reactor system.

16. The process of Claim 3 wherein hydrocarbon products of the reaction are cooled and washed with water at system pressure to condense normally liquid hydrocarbons and remove sulfur compounds.

17. A continuous process for the hydrogenation of coal in a closed pressurized cyclic system without substantial loss of hydrogen pressure, comprising dispersing finely divided coal, in the substantial absence of externally supplied liquid slurry medium, into a stream of substantially pure hydrogen, including purified recycle hydrogen, at hydrogenation temperature and pressure and passing the resulting reaction stream through a reaction zone containing a bed of particulate hydrogenation catalyst at a hydrogen flow rate sufficient to remove products of the reaction from the catalyst bed, maintaining the temperature of the reaction zone in the range of about 450–600° C. and the hydrogen pressure in said zone at from about 1,000–5,000 p.s.i.g., maintaining the purity of the hydrogen and the flow rate of the hydrogen with respect to the coal sufficiently high that the gases and vapors in contact with the catalyst contain at least 90% hydrogen, separating tars and liquid hydrocarbon products from the resulting effluent stream from the reaction zone without reducing the pressure on the gases, and scrubbing the resulting gaseous stream with water at substantially system pressure to remove light oils and hydrogen sulfide and provide substantially pure pressurized hydrogen for recycle to the reaction zone.

References Cited
UNITED STATES PATENTS

| | | | |
|---|---|---|---|
| 1,852,988 | 4/1932 | Varga | 208—10 |
| 2,154,527 | 4/1939 | Pier et al. | 208—10 |
| 2,215,206 | 9/1940 | Biggs et al. | 208—10 |
| 3,030,297 | 4/1962 | Schroeder | 208—8 |
| 3,152,063 | 10/1964 | Schroeder et al. | 208—10 |
| 3,505,204 | 4/1970 | Hoffman | 208—10 |
| 3,565,751 | 2/1971 | Hoekstra | 208—11 |

DELBERT E. GANTZ, Primary Examiner

S. L. BERGER, Assistant Examiner

UNITED STATES PATENT OFFICE
CERTIFICATE OF CORRECTION

Patent No. 3,823,084         Dated July 9, 1974

Inventor(s) W. C. SCHROEDER

It is certified that error appears in the above-identified patent and that said Letters Patent are hereby corrected as shown below:

IN THE SPECIFICATION

Col 1, line 48, correct the spelling of "products".
Col 1, last line, change "catalyst" to --catalysts--

Col 2, line 9, correct the spelling of "slurrying"
Col 2, line 19, correct the spelling of "object"
Col 2, line 36, correct the spelling of "DETAILED"

Col 3, line 59, change "product ion" to --production--

Col 6, line 28, correct the spelling of "carrying

Col 7, line 22, correct the spelling of "processing
Col 7, line 45, change "soils" to --solids--
Col 7, line 50, correct the spelling of "containing"

Col 8, line 69, correct the spelling of "medium"

Signed and sealed this 17th day of December 1974.

(SEAL)
Attest:

McCOY M. GIBSON JR.              C. MARSHALL DANN
Attesting Officer                Commissioner of Patents